US006090293A

United States Patent [19]

Cardini et al.

[11] Patent Number: 6,090,293

[45] Date of Patent: Jul. 18, 2000

[54] PROCESS FOR REDUCING THE QUANTITY OF WATER CONTAINED IN PULPS OF NICKEL-BEARING OXIDE ORES

[76] Inventors: Jean-Louis Cardini, 30 rue Loriot de Rouvray-Raie des Citrons; Jean Roger Paul Regnoult, 7 rue Charles Devambez-Magenta, both of 98800 Noumea, France

[21] Appl. No.: 09/128,178

[22] Filed: Aug. 3, 1998

[30] Foreign Application Priority Data

Aug. 6, 1997 [FR] France .................................. 97 10075

[51] Int. Cl.$^{7}$ ........................................ C02F 1/56

[52] U.S. Cl. ........................ 210/727; 210/728; 210/734; 209/5

[58] Field of Search .................................. 210/723, 725, 210/726, 727, 728, 729, 730, 731, 732, 734; 209/5

[56] References Cited

U.S. PATENT DOCUMENTS

| | | | |
|---|---|---|---|
| 3,578,586 | 5/1971 | Gal et al. | 210/725 |
| 3,974,116 | 8/1976 | Lissant | 210/732 |
| 4,110,401 | 8/1978 | Hoover et al. | 423/150 |
| 4,705,672 | 11/1987 | McCurdy et al. | 423/3 |
| 4,872,993 | 10/1989 | Harrison | 210/727 |
| 4,911,848 | 3/1990 | Cardini et al. | 210/710 |
| 5,518,634 | 5/1996 | Pillai et al. | 210/727 |

OTHER PUBLICATIONS

Database WPI Section Ch Week 9330, Derwent Publications Ltd London GB, Class A14 AN93–241871 XP P002061848.

*Primary Examiner*—David A. Simmons
*Assistant Examiner*—Frank M. Lawrence

[57] ABSTRACT

In this process for reducing the quantity of water contained in pulps of nickel-bearing ores, the pulp is diluted with water, a dilute aqueous solution of a flocculant based on an acrylic acid copolymer is injected, the mixture is left to decant, then the underflow and overflow are separated.

9 Claims, No Drawings

PROCESS FOR REDUCING THE QUANTITY OF WATER CONTAINED IN PULPS OF NICKEL-BEARING OXIDE ORES

The invention relates to a new process which makes it possible to eliminate the majority of the water contained in pulps of nickel oxide ore.

It relates more particularly to the conditions of flocculation and decantation of said ores which may, at some stage in their treatment, be wholly or partly in the form of a more or less dilute pulp.

These pulps are most often characterised in that:

- they are extremely dilute, as 70% of the weight of the pulp may consist of water and only 30% solids,
- they cannot settle out naturally so as to obtain a clear aqueous phase and a highly thickened pulp,
- they are not handled other than by pumping,
- they cannot be used directly in furnaces for working metal, without previously being thermally dried, which is a very expensive operation.

A considerable number of documents, theses and patents relating to the flocculation and decantation of mineral pulps have been published both in the field of water treatment and in the field of the treatment of ores. However, the strict application of the processes thus described to garnieritic nickel oxide ores is either totally ineffective or prohibitively expensive to carry out.

According to US-A-4 110 401 lixiviated pulps are treated in an acid medium and not in a neutral medium, at temperatures above 150° C. and not at ambient temperature, whereas in SU 1 754 162, it is proposed to use a flocculant and a coagulant simultaneously without previously diluting the pulp.

By way of example, we might mention the one known study of nickel oxide ores described in French patent 2 320 781. This patent describes a method of flocculation which consists in adding 1500 g/Ts of flocculant, after adjusting the pH to a value of 6.7. The pulps thus flocculated decant very slowly, because the decantation surface area required, calculated by the Kynch, Roberts method, is of the order of 45 to 46 $m^2$/Ts/h, and the concentration of the underflows, thickened pulp, is then doubled, because it changes from 10% of dry matter to 20%. of dry matter per kilogram of pulp. A process of this kind is economically non-viable and generates very high costs for flocculant and enormous surface areas for the decanter, as 4,600 $m^2$ of decanter are needed to treat 100 Ts/h, i.e. an apparatus 77 m in diameter would be required.

Moreover, the use of this process in an industrial installation, and particularly such substantial amounts of organic flocculant, would lead to major practical problems. In fact, as has already been described in the literature (cf. the book Mineral Processing Plane Design by Mular and Bhoppi, Society of Mining Engineers, 1978, p. 570), the operation of the decanter would be disrupted by the formation of "islands", clumps of viscous solids, preventing the sedimentation of the particles.

The invention overcomes these disadvantages by means of a process which comprises successively

- diluting the pulp with water to a concentration of less than 150 g of solids per liter and preferably less than 80 g of solids per liter,
- injecting into the diluted pulp an aqueous solution diluted to less than 1 g per liter and, preferably, less than 0.5 g per liter, of an organic flocculant based on a copolymer derived from slightly anionic acrylic acid with a mean molecular mass by weight of from $2.10^6$ to $3.10^6$, in an amount of from 50 to 1000 g per tonne of dry matter in the pulp and leaving the injected solution in contact with the dilute pulp for a length of time sufficient to obtain an overflow containing less than 100 mg of solids per liter and an underflow containing between 450 and 300 g of solids per liter, and
- separating the underflow from the overflow.

Paradoxically, the pulp is deliberately diluted before flocculation so that the water can eventually be removed more satisfactorily by flocculation.

The entire process can be carried out at ambient temperature (5 to 35° C.).

The first stage of the process comprises diluting the pulp with water to a concentration of less than 150 g of solids per liter and preferably less than 80 g of solids per liter. Preferably, an ore with a particle size of less than 500 microns is used.

The second stage of the process according to the invention comprises injecting into the diluted pulp a dilute aqueous solution of an organic flocculant based on a copolymer derived from acrylic acid. The flocculant may be an acrylic acid salt of the polyacrylamide family having a mean molecular mass by weight of from $2.10^6$ to $3.10^6$, wherein at most 40k and preferably at most 30% of the number of copolymer units carry a negative surface charge such that it may be measured by potentiometry. Flocculants of this type are available, for example, under the name AF 400 from the company BASF or under the name AN 934 from the company Floerger.

A greater amount of flocculent is needed, the smaller the particle size of the solids in the pulp. The amount ranges from 300 to 1000 g and, preferably, from 300 to 500 g per tonne of dry matter in the pulp, for a particle size of the solids therein of less than 15 microns. The amount ranges from 60 to 160 g per tonne of dry matter for a particle size of less than 200 microns. The period of contact between the pulp and the solution of the flocculant is less than 2 minutes and, preferably, less than 1 minute when the flocculation is carried out in a stirred tank. Too long a contact time can destroy any flakes already formed.

The flocculant is preferably injected into the diluted pulp at a number of points. This injection may be carried out in a tank with moderate stirring or, for an even more satisfactory result, in the flocculation tank and in the intake pipes for feeding the pulps into the decanter, or even in the injection shaft of the decanter.

When the flocculation takes place in a stirred tank, the retention time of the pulp in the reactor must not exceed 2 minutes and, preferably, 1 minute, as excessively long retention times can destroy any flakes already formed.

When the flocculation is carried out at several points on the circuit, it is beneficial to use the following distribution: one third of the total amount of flocculant in the flocculating reactor, one third in the pipes feeding the pulp into the decanter and the remaining third in the supply shaft of the decanter. This distribution may be modified depending on the type of ore being treated.

If the total amount of flocculant is not enough, the flocculation will be incomplete and the overflow of the decanter will be highly charged with solid matter, which is the opposite of the desired effect. At the same time, and this may be important if the solids are to undergo mechanical filtration at a later stage, the underflows of the decanter will not be thick enough, which means that very large filtration surfaces will be required.

If the total amount of flocculant is excessive, this will in no way improve the characteristics of the overflows and underflows but at the same time will open up the possibility of the "island" phenomenon mentioned hereinbefore.

The pulp flocculated in this way then decants rapidly so as to obtain a clear overflow containing very little suspended solid matter (less than 100 mg/i) and an underflow with a concentration of between 450 and 300 g/l, depending on the particle size of the pulps treated. This underflow is then suitable for pumping into installations which will carry out the elimination of the residual water, e.g. by mechanical filtration or thermal drying.

The pH of the pulps to be flocculated is neither checked nor regulated; the operation is generally carried out at pH values of between 6 and 8.

Depending on the treatment to which the underflows from the decanter will ultimately be subjected, and particularly in cases where these underflows are intended to be filtered by mechanical processes such as filter pressing, a certain number of adjuvants may be added before the flocculant which have virtually no effect on the decanting performance but which greatly improve the rate of filtration.

Of these adjuvants, the following may be mentioned:

- lime, in amounts of between 1 and 3% by weight, based on the solid matter contained in the pulp,
- coagulants of the family of highly cationic polyamines wherein at least 50k of the units carry a positive charge, having a mean molecular mass of less than $3.10^6$, such as the product sold under the name FL 28 P2 by the company Floerger.

Polyamine is generally used in an amount of from 1 to 50 ppm by weight based on the solids in the pulp.

The following Examples illustrate the invention.

All the experiments were carried out in a laboratory decanter sold by the company ENVIROCLEAR, characterised in that the flocculation and decantation are carried out dynamically and not statically, as is the case in the tests on samples known to the skilled person under the name JARTEST.

The Enviro-Clear laboratory decanter is a continuous decanter with an internal diameter of 10 cm, with which flocculation/decantation of the pulps can be carried out dynamically.

The pulp to be flocculated is fed in via the decanter. The height of the intake pipe for the pulps is adjustable and enables the pulp to be fed into the decanter in the layer of sludge. This has a number of advantages:

- the flakes are trapped in the layer of sludge, thereby limiting the presence of flakes in the overflow;
- in the upper part of the layer of sludge (above the feed pipe) permanent agitation allows flocculation to proceed and flakes to grow.

The flocculant is injected into the pulp supply pipe, before it reaches the decanter. This ensures good dispersal of the flocculant in the pulp.

A deflector placed above the pulp inlet ensures good distribution and homogenisation of the pulp. The spacing between the deflector and the feed pipe is adjustable.

A system of agitation with offset pulps allows better dispersal of the pulp as it arrives in the layer of sludge and ensures more uniform decantation.

A sludge level sensor, based on the reflection of the signal emitted by infra-red lamps, is placed on the side of the decanter. Its height in relation to the level of the pulp inlet can be adjusted and therefore governs the height of the level of sludge above the feed. The extraction pump is controlled by this level sensor.

The pumps for supplying pulp and flocculant and the extraction pump are peristaltic pumps.

After the geometric characteristics of the apparatus have been adjusted (height of sludge—level of injection of pulp), a dilute solution of flocculant (dilution 0.1 g/l) is injected into the pulp before it is fed into the apparatus.

In the same way, the flow rate of pulp is ensured by a variable speed pump which covers a wide range of flow rates.

After equilibrium has been reached, the overflow and underflow are sampled in order to measure their chief characteristics, namely:

- the concentation in % ms or in g/l for the underflow,
- the level of suspended matter in mg/l for the overflow.

EXAMPLE 1 (comparative)

A nickel ore pulp with a particle size of 0/250 $\mu$ is diluted to 68.8 g/l.

This pulp is pumped to the decanter at a rate of 10 l/h, corresponding to a flow rate by volume of 1.27 $m^3/m^2/h$ of decanter and a flow rate of solids of 0.087 $Ts/m^2/h$ of solids, corresponding to a decanter surface of 11.44 $m^2/Ts/h$ of solids to be decanted.

No flocculant is added to the pulp.

After 1 hour of continuous operation, no sedimentation has occurred and the concentration of the underflow and overflow are practically identical to that of the material fed in, i.e. 68.8 g/l. At most, it might be observed that particles bigger than 100 microns are settling in the apparatus.

EXAMPLE 2

One aliquot of the pulp used in Example 1 is injected into the laboratory decanter under the same conditions of flow.

A solution of the flocculant SEDIPUR AF 403 diluted to 0.1 g/l is added so as to use a quantity of active flocculant of 150 g/Ts to be flocculated.

After 1 hour of continuous operation, the overflow and underflow are sampled, and an overflow having a concentration of 112 mg/l and an underflow having a concentration of 531 g/l are obtained.

EXAMPLE 3

A pulp of nickel ore with a particle size of 0/63 $\mu$ is diluted to 69.6 g/l.

This pulp is pumped to the decanter at a flow rate of 10 l/h, i.e. under the same conditions as in Examples 1 and 2.

The flocculant AF 403 is added under the same conditions as in Example 2, but in a quantity of active substance of 200 g/Ts.

After 1 hour of continuous operation, the overflow and underflow are sampled. An overflow having a concentration of 102 mg/l and an underflow having a concentration of 470 g/l are obtained.

EXAMPLE 4

A pulp of nickel ore with a particle size of 0/15 $\mu$ is diluted to 73.6 g/l.

The operating conditions are the same as in Example 3, except for the flocculant, which is injected in a quantity of active substance of 450 g/Ts.

After 1 hour of continuous operation, the overflow and underflow are sampled.

An overflow having a concentration of 112 mg/l and an underflow having a concentration of 354 g/l are obtained.

EXAMPLE 5

The same pulp is used as in Example 2, but this pulp is not diluted before treatment and is in a concentration of 215 g/l.

This pulp is injected under the same conditions as in Example 2 and the flocculation is also carried out in the same way.

It is observed that the flocculation is very poor and after 1 hour's operation the overflow is highly charged with 5 g of solids per liter.

The amount of flocculant is then modified so as to inject a dose corresponding to 280 g/Ts.

Under these conditions and after one hour's operation, results are obtained which are similar to those of Example 2.

EXAMPLE 6

The same pulp is used as in Example 2, diluted to 70 g/l, and before it is injected into the decanter the pulp is treated by the addition of 125 ppm (parts per million) by volume of a coagulant known by the name Floerger FL 28 PE diluted to 1 g/l. This treatment is carried out in a 100 1 reactor stirred under normal conditions.

The pulp is injected at a rate of 10 l/h after the addition of the flocculant (SEDIPUR AF 403) in an amount of 150 g/l.

After 1 hour of continuous operation, the overflow and underflow are sampled.

An overflow having a concentration of 4 mg/l and an underflow having a concentration of 470 g/l are obtained.

What is claimed is:

1. Flocculating process for reducing the quantity of water contained in pulps of nickel oxide ore, comprising the following successive steps:

adding in water to create a diluted pulp with a concentration of less than 150 g of solids per liter;

injecting into the diluted pulp an aqueous solution diluted to less than 1 g per liter of an organic flocculent based on a copolymer derived from slightly anionic acrylic acid with a mean molecular mass by weight of from $2.10^6$ to $3.10^6$, in an amount selected from 300 to 1000 g per ton of dry matter in the pulp for a particle size of the pulp of less than 15 microns and of 60 to 160 g per ton of dry matter in the pulp for a particle size of the pulp of less than 200 microns so as to carryout complete flocculation and leaving the injected solution in contact with the dilute pulp for a length of time sufficient to obtain an overflow containing less than 100 mg of solids per liter and an underflow containing between 450 and 300 g of solids per liter; and separating the underflow from the overflow.

2. Flocculating process according to claim 1, wherein the pulp and the flocculent solution are in contact for a period of time less than 2 minutes.

3. Flocculating process according to claim 1, wherein the flocculent solution is injected at several different points.

4. Flocculating process according to claim 1, wherein a coagulant or lime is added to the pulp before the flocculent solution is injected.

5. Flocculating process according to claim 4, wherein the coagulant is a highly cationic polyamine, wherein at least 50% of the number of units carry a positive charge and which has a mean molecular mass by weight of less than $3.10^6$, the coagulant being added in an amount of from 10 to 50 ppm by weight based on the volume of the pulp.

6. Flocculating process according to claim 4, wherein the lime is added in an amount of 1 to 3% by weight based on the solids in the pulp.

7. Flocculating process according to claim 1, wherein the pulp is diluted with water to a concentration of less than 80 g of solids per liter.

8. Flocculating process according to claim 1, wherein the aqueous solution infected into the diluted pulp is diluted to less than 0.5 g per liter of the organic flocculent.

9. Flocculating process according to claim 1, which is carried out at a temperature of between 5 and 35° C.

* * * * *

UNITED STATES PATENT AND TRADEMARK OFFICE

CERTIFICATE OF CORRECTION

PATENT NO. : 6,090,293

DATED : July 18, 2000

INVENTOR(S) : Jean-Louis Cardini et al.

It is certified that error appears in the above-identified patent and that said Letters Patent is hereby corrected as shown below:

On the title page

Assignee: Not shown on Patent. Recorded 10/5/98,
Reel/Frame: 9505/0171
Should be --Societe Le Nickel-SLN
Pointe Doniambo
98800 Noumea, New Caledonia--.

In the Claims:
Claim 9, col. 6, line 33, "infected" should be --injected--.

Signed and Sealed this

First Day of May, 2001

Attest:

NICHOLAS P. GODICI

*Attesting Officer* *Acting Director of the United States Patent and Trademark Office*